United States Patent
Hudson, Jr. et al.

(10) Patent No.: US 9,440,694 B2
(45) Date of Patent: Sep. 13, 2016

(54) PIVOTING EQUIPMENT BRACKET

(71) Applicant: Feedback Sports LLC, Golden, CO (US)

(72) Inventors: Douglas Hudson, Jr., Golden, CO (US); Braden Bingham, Longmont, CO (US)

(73) Assignee: FEEDBACK SPORTS LLC, Golden, CO (US)

( * ) Notice: Subject to any disclaimer, the term of this patent is extended or adjusted under 35 U.S.C. 154(b) by 79 days.

(21) Appl. No.: 14/468,573

(22) Filed: Aug. 26, 2014

(65) Prior Publication Data

US 2016/0059917 A1    Mar. 3, 2016

(51) Int. Cl.
| | |
|---|---|
| *F16M 1/00* | (2006.01) |
| *B62H 3/12* | (2006.01) |
| *B62H 3/06* | (2006.01) |

(52) U.S. Cl.
CPC . *B62H 3/12* (2013.01); *B62H 3/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 572,770 | A * | 12/1896 | Putnam | B62H 3/12 211/19 |
| 590,425 | A * | 9/1897 | Smart | B62H 3/00 211/19 |
| 599,645 | A * | 2/1898 | Snyder | B62H 3/12 211/19 |
| 625,657 | A * | 5/1899 | Elliot | A61M 25/04 604/104 |
| 639,517 | A * | 12/1899 | Butcher | B62H 3/04 211/19 |
| 754,483 | A * | 3/1904 | Mustgrove | E05B 73/0082 248/552 |
| 3,223,375 | A * | 12/1965 | Bernasconi | B60P 7/0807 248/308 |
| 3,357,670 | A * | 12/1967 | Larson | B60R 9/00 211/100 |
| 3,907,113 | A * | 9/1975 | Kropelnitski | B62H 3/12 211/19 |
| 4,063,647 | A * | 12/1977 | Blackmore | B62H 3/12 211/19 |
| 4,074,884 | A * | 2/1978 | Antoszewski | A47G 25/0607 248/289.11 |
| 4,352,432 | A * | 10/1982 | Smith | B62H 3/08 211/19 |

(Continued)

FOREIGN PATENT DOCUMENTS

| | | | | |
|---|---|---|---|---|
| CA | 2772596 | | 9/2013 | |
| GB | 2505073 | A * | 2/2014 | B62H 3/12 |

OTHER PUBLICATIONS

Translation of CA 2772596 submitted by applicant is IDS Aug. 26, 2014.*

(Continued)

*Primary Examiner* — Monica Millner
(74) *Attorney, Agent, or Firm* — HolzerIPLaw, PC

(57) ABSTRACT

A pivoting equipment bracket incorporates a hinged hook that selectively projects from a front plate of the bracket and a hinged front plate that selectively orients a piece of equipment hung from the bracket at a desired angle with reference to a wall that the bracket is mounted on. A pivot catch may be used to secure an opposite end of the piece of equipment as the front plate is hinged with reference to the wall. The multi-axis pivoting bracket may be used to hang various piece of equipment, including sporting equipment, and more specifically including bicycles from the wall.

19 Claims, 10 Drawing Sheets

(56) References Cited

U.S. PATENT DOCUMENTS

| | | | | |
|---|---|---|---|---|
| 5,078,276 A * | 1/1992 | Rogge | ................. | B62H 3/12 |
| | | | | 211/18 |
| 5,083,729 A * | 1/1992 | Saeks | ................. | B62H 3/12 |
| | | | | 211/17 |
| 5,094,417 A * | 3/1992 | Creed | ................. | A47G 29/083 |
| | | | | 248/215 |
| 5,246,120 A * | 9/1993 | Walker | ................. | B62H 3/12 |
| | | | | 211/19 |
| 5,332,104 A * | 7/1994 | Santella | ................. | B62H 3/12 |
| | | | | 211/18 |
| 5,662,256 A * | 9/1997 | Bryan | ................. | B60R 9/06 |
| | | | | 211/18 |
| 5,687,857 A * | 11/1997 | Friedman | ................. | A63C 11/028 |
| | | | | 211/18 |
| 5,842,581 A * | 12/1998 | Graefe | ................. | B62H 3/00 |
| | | | | 211/119.004 |
| 5,941,397 A * | 8/1999 | Buchanan | ................. | B62H 3/12 |
| | | | | 211/19 |
| 6,983,853 B1 * | 1/2006 | Fickett | ................. | A47F 5/04 |
| | | | | 211/18 |
| 7,669,822 B2 * | 3/2010 | Kluge | ................. | F16B 45/02 |
| | | | | 211/18 |
| 7,681,851 B1 * | 3/2010 | Osterholt | ................. | A47G 25/065 |
| | | | | 248/308 |
| 8,002,225 B1 * | 8/2011 | Malone | ................. | A47B 81/00 |
| | | | | 211/118 |
| 8,011,633 B2 * | 9/2011 | Huang | ................. | A47G 25/0635 |
| | | | | 248/292.13 |
| 8,413,820 B2 | 4/2013 | Steadman et al. | | |
| 8,528,749 B2 * | 9/2013 | Kerman | ................. | B62H 3/00 |
| | | | | 211/196 |
| 8,794,454 B2 * | 8/2014 | Bleazard | ................. | B62H 3/12 |
| | | | | 211/19 |
| 9,173,507 B2 * | 11/2015 | Thrush | ................. | F16M 13/02 |

OTHER PUBLICATIONS

Home Depot.com online store product page for Everbilt Heavy Duty Flip-Up Storage Hanger, Model # 01195, Internet # 202305470, Store SKU # 470777, Product Overview and Specifications, retrieved from the Internet on Aug. 25, 2014., 1 page.

\* cited by examiner

PIVOTING EQUIPMENT BRACKET

BACKGROUND

Bicycles and other sporting equipment are often large and awkwardly shaped, which makes storage in limited space challenging for a user. As a result, such sporting equipment is often piled loosely along a wall or in a corner of a store front, garage or living space. Existing options for neatly storing such sporting equipment in a minimum amount of space and still allowing for easy access to the sporting equipment are limited.

One existing option is mounting a hook or series of hooks on a wall or ceiling of the user's garage or living space and hanging the sporting equipment from the hook(s). While this option frees up floor space within the store front, garage, or living space, the sporting equipment is held in a relatively fixed orientation with respect to the wall or ceiling. Further, the hook(s) continue to extend from the wall and are unsightly when not in use.

Some existing hooks hinge toward the wall and out of the way when not in use, but still orient the sporting equipment in a relatively fixed orientation with respect to the wall or ceiling during use and are still relatively unsightly when not in use.

SUMMARY

Implementations described and claimed herein address the foregoing problems by providing a multi-axis pivoting bracket that enables various sporting equipment to be hung from a wall and then pivoted toward the wall in order to free up space along the wall. When not in use, the bracket may be closed, securing a corresponding hook therein and providing a clean outward appearance to the user.

Other implementations are also described and recited herein.

BRIEF DESCRIPTIONS OF THE DRAWINGS

DETAILED DESCRIPTIONS

Figure 1:
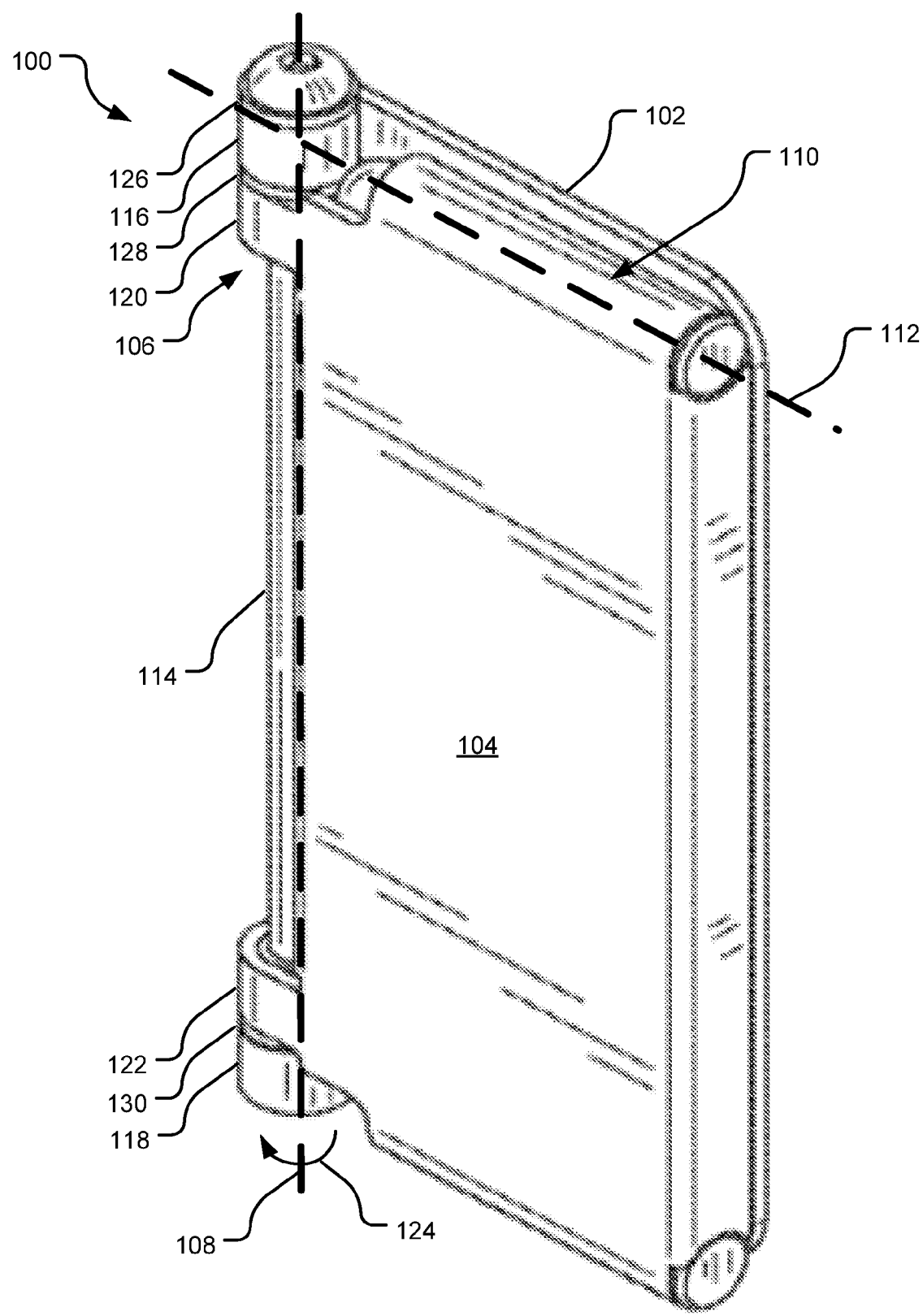
FIG. 1 is a front perspective view of an example multi-axis pivoting bracket in a closed orientation with a corresponding hook stowed within the bracket.

FIG. 1 is a front perspective view of an example multi-axis pivoting bracket 100 in a closed orientation with a corresponding hook (not shown, see FIGS. 3-6) stowed within the bracket 100. The bracket 100 can be shipped efficiently and when installed, provides a clean outward appearance to the user when oriented as shown in FIG. 1. FIGS. 3-6 below depict the bracket 100 in various orientations where the bracket 100 may be used to hang sporting equipment.

The bracket 100 includes three major components, a back plate 102, a front plate 104, and the hook. The back plate 102 includes mounting holes (not shown, see FIGS. 2-4, 6 and 7) that allow the bracket 100 to be mounted on a wall stud (not shown, see FIG. 7) or other structural surface of a wall (not shown, see e.g., FIGS. 8-9). When installed, the back plate 102 is fixedly attached to the wall. The front plate 104 is rotationally attached to the back plate 102 at hinge 106. The hinge 106 allows the front plate 104 to rotate with respect to the back plate 102 about axis 108. The hook is rotationally attached to the front plate 104 at hinge 110. The hinge 110 allows the hook to rotate with respect to the front plate 104 about axis 112. In the configuration of FIG. 1, the hook is stowed within the front plate 104 and adjacent the back plate 102.

Each of the back plate 102 and front plate 104 include a pair of hinge barrels (i.e., barrels 116, 118 of the back plate 102 and barrels 120, 122 of the front plate 104) to compose the hinge 106. Each of the hinge barrels is a hollow cylindrical structure fixedly attached (and in some implementations contiguous) with the corresponding back plate 102 and front plate 104. The hinge 106 further includes a bolt 114 that extends through the hinge barrels, screws into the hinge barrel 118, and forms the pivot of the hinge 106. In other implementations, the bolt 114 screws into a nut (not shown) adjacent the hinge barrel 118. In still other implementations, the bolt is replaced with a pin that interference fits within the hinge barrels and gravity holds the pin in place. As a result, the front plate 104 may rotate about the axis 108 with respect to the back plate 102 as illustrated by arrow 124. In other implementations, the hinge 106 takes a different structural form.

Bushing 126 lies between the bolt 114 head and the hinge barrel 116, bushing 128 lies between the hinge barrel 116 and the hinge barrel 120, and bushing 130 lies between the hinge barrel 118 and the hinge barrel 122. As the bolt is tightened, pressure on interface surfaces between the bolt 114 head, the hinge barrels 116, 118, 120, 122, and the bushings 126, 128, 130 increases, which in turn increases resistance to rotation of the front plate 104 about the axis 108. Similarly, as the bolt is loosened, pressure on interface surfaces between the bolt 114 head, the hinge barrels 116, 118, 120, 122, and the bushings 126, 128, 130 decreases, which in turn decreases resistance to rotation of the front plate 104 about the axis 108. As a result, the resistance to rotation of the front plate 104 about the axis 108 may be tuned by tightening and loosening the bolt 114.

All components of the bracket 100 may be made of any material suitable for its intended purpose within the bracket 100 (e.g., aluminum, steel, various metallic alloys, wood, rubber, and plastic). For example, structural components of the bracket 100 (e.g., the back plate 102 and front plate 104, and the bolt 114) may be made of steel and the bushings 126, 128, 130 may be made of a material softer than the surrounding steel (e.g., a plastic, vinyl, or rubber material).

In various implementations, each of the back plate 102 and the front plate 104 is made of approximately 1/16 inch or 1/32-3/32 inch thick plate steel. The back plate 102 is approximately 7 inches or 5-9 inches tall and approximately 3 inches or 2-4 inches wide. The front plate 104 is also approximately 7 inches or 5-9 inches tall and approximately 3 inches or 2-4 inches wide. The front plate 104 is also approximately ½ inch or ¼-¾ inches deep by rolling ends of the plate steel over to create depth within the front plate 104. The bolt 114 is approximately ¼ inch or 3/16-5/16 inch in diameter.

Figure 2:
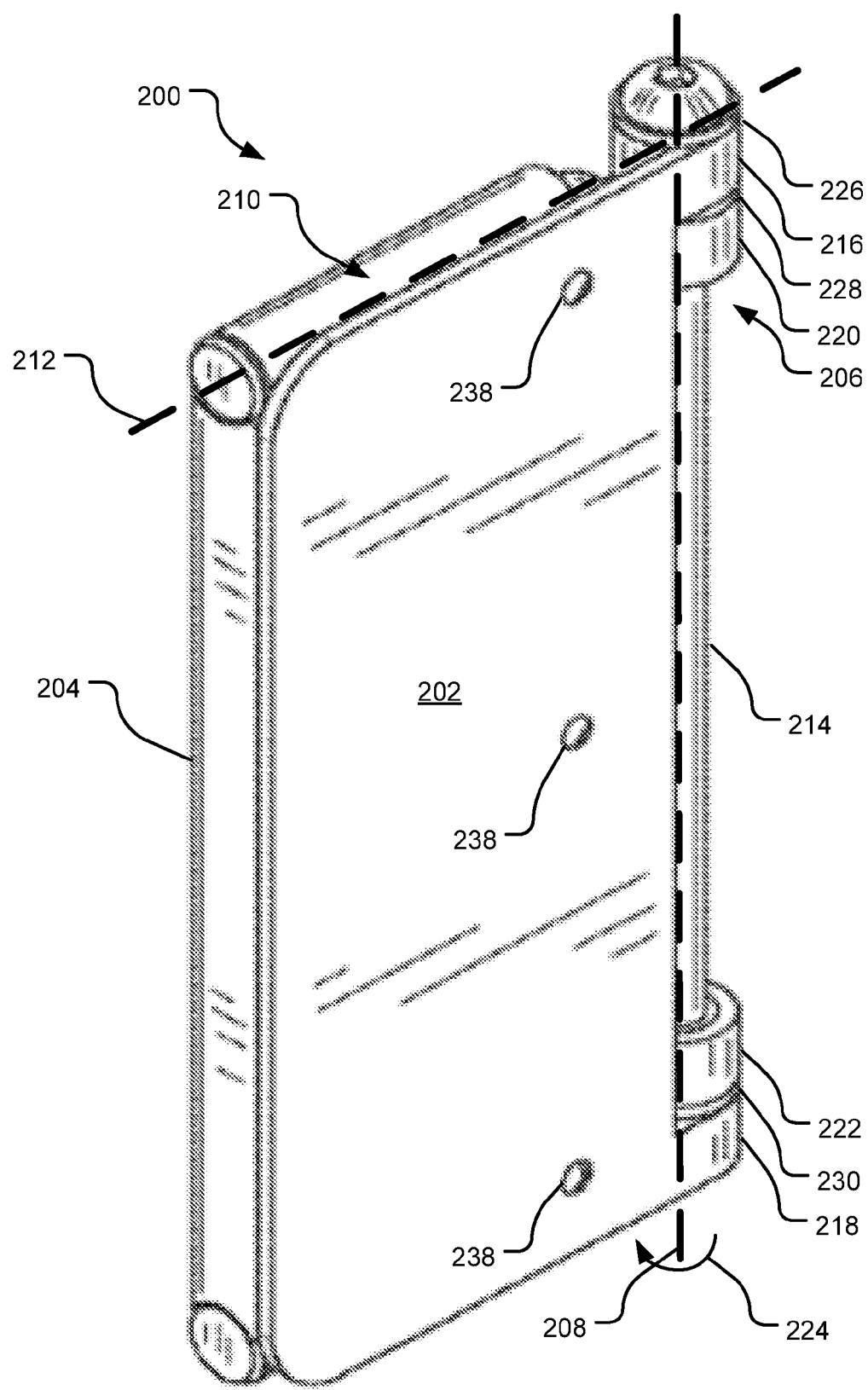
FIG. 2 is a rear perspective view of an example multi-axis pivoting bracket in a closed orientation with a corresponding hook stowed within the bracket.

FIG. 2 is a rear perspective view of an example multi-axis pivoting bracket 200 in a closed orientation with a corresponding hook (not shown, see FIGS. 3-6) stowed within the bracket 200. The bracket 200 includes three major components, a back plate 202, a front plate 204, and the hook. The back plate 202 includes mounting holes 238 that allow the bracket 200 to be mounted to a wall. The front plate 204 is rotationally attached to the back plate 202 at hinge 206. The hinge 206 allows the front plate 204 to rotate with respect to the back plate 202 about axis 208. The hook is rotationally attached to the front plate 204 at hinge 210. The hinge 210 allows the hook to rotate with respect to the front plate 204 about axis 212. In the configuration of FIG. 2, the hook is stowed within the front plate 204 and adjacent the back plate 202.

Each of the back plate 202 and front plate 204 include a pair of hinge barrels (i.e., barrels 216, 218 of the back plate 202 and barrels 220, 222 of the front plate 204) and bushings 226, 228, 230 to compose the hinge 206. The hinge 206 further includes a bolt 214 that extends through the hinge barrels and the bushings, screws into the hinge barrel 218, and forms the pivot of the hinge 206. As a result, the front plate 204 may rotate about the axis 208 with respect to the back plate 202 as illustrated by arrow 224.

Figure 3:
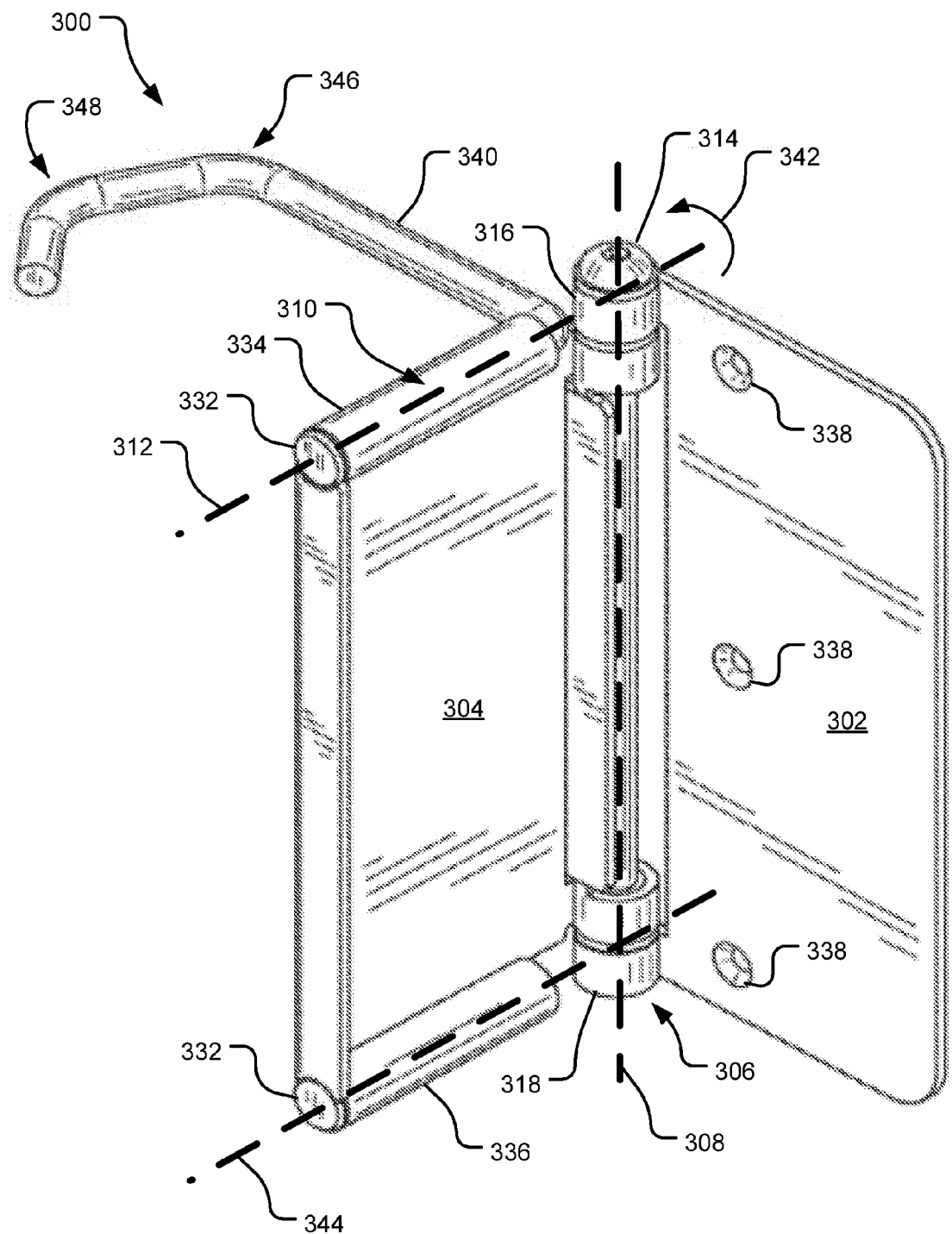
FIG. 3 is a front perspective view of an example multi-axis pivoting bracket in an open orientation with a corresponding hook extending from the bracket.

FIG. 3 is a front perspective view of an example multi-axis pivoting bracket 300 in an open orientation with a corresponding hook 340 extending from the bracket 300. The bracket 300 includes three major components, a back plate 302, a front plate 304, and the hook 340. The back plate 302 includes mounting holes 338 that allow the bracket 300 to be mounted to a wall. The mounting holes 338 are counter-sunk to accommodate a screw flush with the depicted surface of the back plate 302.

The front plate 304 is rotationally attached to the back plate 302 at hinge 306. The hinge 306 allows the front plate 304 to rotate with respect to the back plate 302 about axis 308. The hook 340 is rotationally attached to the front plate 304 at hinge 310. The hinge 310 allows the hook 340 to rotate with respect to the front plate 304 about axis 312. In the configuration of FIG. 3, the front plate 304 is rotated away from the back plate 302 about axis 308, exposing the hook 340. The hook 340 is rotated out of the front plate 304 about axis 312 and comes to rest in an orientation extending from the axis 312 approximately 90° or 80°-100° from the primary interior surface plane of the front plate 304. The hook 340 is held in place at approximately 90° by gravity pressing the hook 340 against a stop (not shown, see e.g., FIG. 5).

The front plate 304 includes a long hinge barrel 334 to compose the hinge 310. The long hinge barrel 334 is a hollow cylindrical structure fixedly attached to (and in some implementations contiguous with) the front plate 304. In some implementations, the long hinge barrel 334 is merely a rolled end of the front plate 304. At least a concealed end of the hook 340 has a smaller outer diameter than the inner diameter of the long hinge barrel 334 and extends through the long hinge barrel 334 to form the pivot of the hinge 310. The concealed hook 340 end is held loosely in place within the long hinge barrel 334 by contact with hinge barrel 316 of the hinge 306. As a result, the hook 340 may rotate about the axis 312 with respect to the front plate 304 as illustrated by arrow 342. In other implementations, the hinge 310 takes a different structural form.

The front plate 304 further includes a second long hinge barrel 336, which may selectively be used in conjunction with the hook 340 to compose a second alternative hinge that allows the hook to instead rotate about axis 344. In order to compose the second hinge, bolt 314 is removed from the hinge 306, allowing the hinge 306 to come apart. The hook 340 is then removed from the long hinge barrel 334 and inserted into the other long hinge barrel 336. The bolt 314 is then replaced in the hinge 306 and the hook 340 is held in place by hinge barrel 318 of the hinge 306.

When the hook 340 utilizes long hinge barrel 334 to compose the hinge 310, as depicted in FIG. 3, the front plate 304 opens to the left when facing the back plate 302. In an alternative implementation where the hook 340 utilizes the second long hinge barrel 336 to compose a hinge about axis 344, the bracket 300 is rotated 180° and then the front plate 304 opens to the right rather than to the left. Caps 332 may serve to plug one or more open ends of the two hook hinge barrels 334, 336 via an interference fit. In other implementations, the caps 332 are omitted. The caps 332 may be made of various materials (e.g., metallic alloys, plastics, or rubber).

The hook 340 itself extends away from the hinge 310 and includes two breaks 346, 348 to form the exposed end of the hook 340. In other implementations, the hook 340 includes a greater or fewer number of breaks to form the exposed end of the hook 340. In still other implementations, a radius is applied to the exposed end of the hook 340 in lieu of one or more breaks. Further, the exposed end of the hook 340 may be covered with a sleeve or coating of a softer material (e.g., plastic, vinyl, or rubber) to cushion the hook 340 where it may be interface with various sporting equipment.

In various implementations, when the bracket 300 is oriented as depicted in FIG. 3, the hook 340 extends away from the front plate 304 approximately 4 inches or 3-5 inches. Further, the hook 340 itself is formed from a rod approximately 5/16 inch or ¼-⅜ inch in diameter. The exposed end of the hook 340 may have an approximately 1½ inch or 1¼-1¾ inch radius formed by one or more breaks or a smooth curve. The hook 340 may be made of steel, although the other materials mentioned above may also be used.

Figure 4:
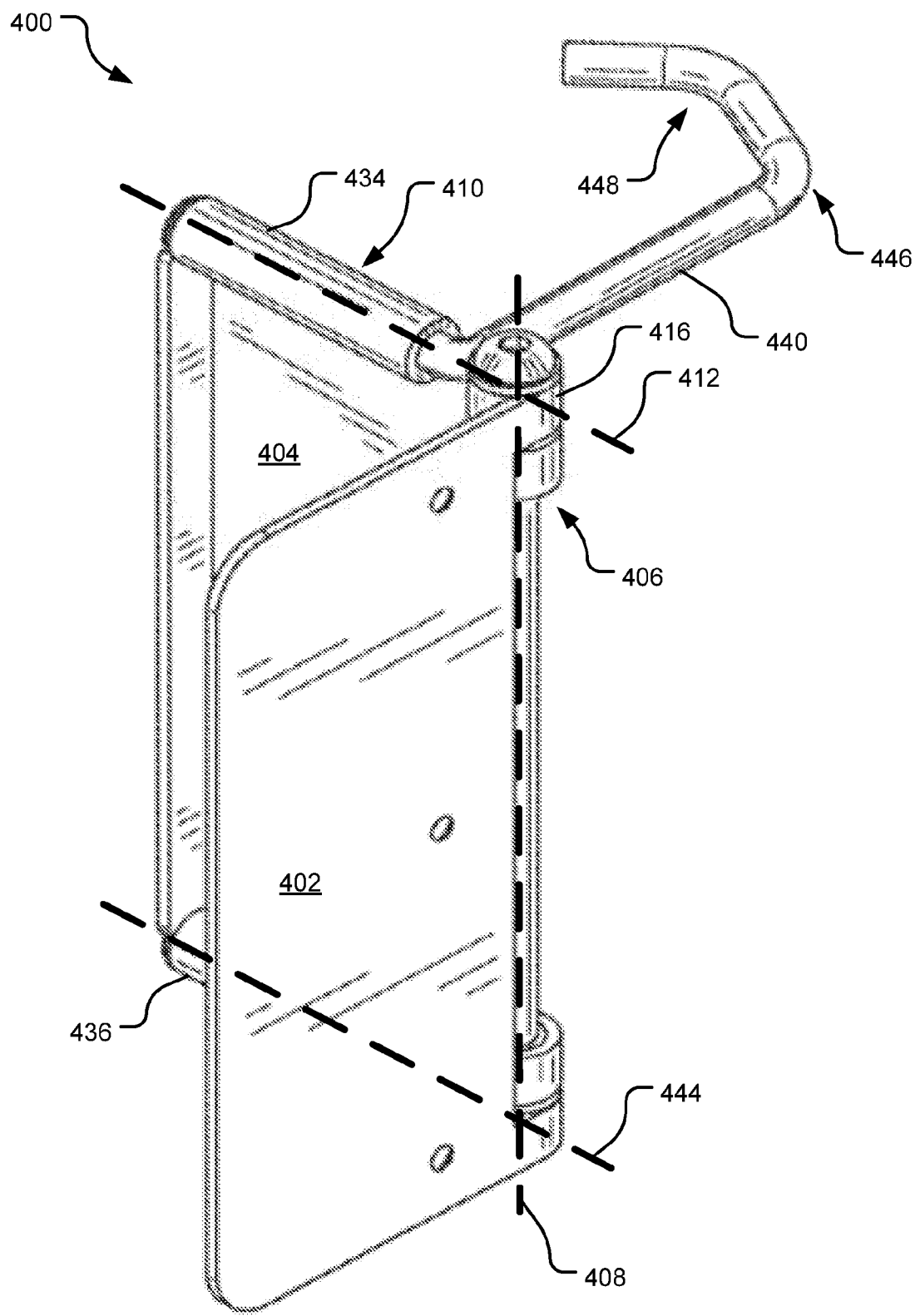
FIG. 4 is a rear perspective view of an example multi-axis pivoting bracket in an open orientation with a corresponding hook extending from the bracket.

FIG. 4 is a rear perspective view of an example multi-axis pivoting bracket 400 in an open orientation with a corresponding hook 440 extending from the bracket 400. The bracket 400 includes three major components, a back plate 402, a front plate 404, and the hook 440. The front plate 404 is rotationally attached to the back plate 402 at hinge 406. The hinge 406 allows the front plate 404 to rotate with respect to the back plate 402 about axis 408. The hook 440 is rotationally attached to the front plate 404 at hinge 410. The hinge 410 allows the hook 440 to rotate with respect to the front plate 404 about axis 412.

In the configuration of FIG. 4, the front plate 404 is rotated away from the back plate 402 about axis 408, exposing the hook 440. The hook 440 is rotated out of the front plate 404 about axis 412 and comes to rest in an orientation extending from the axis 412 approximately 90° from the primary interior surface plane of the front plate 404. The hook 440 is held in place at approximately 90° by gravity pressing the hook 440 against a stop (not shown, see e.g., FIG. 5).

The front plate 404 includes a long hinge barrel 434 to compose the hinge 410. A concealed end of the hook 440 extends through the long hinge barrel 434 to form the pivot of the hinge 410. The concealed end of the hook 440 is held loosely in place within the long hinge barrel 434 by contact with hinge barrel 416 of the hinge 406. The front plate 404 further includes a second long hinge barrel 436, which could be used in conjunction with the hook 440 to compose a second alternative hinge that allows the hook to instead rotate about axis 444. The hook 440 itself extends away from the hinge 410 and includes two breaks 446, 448 to form the exposed end of the hook 440.

Figure 5:
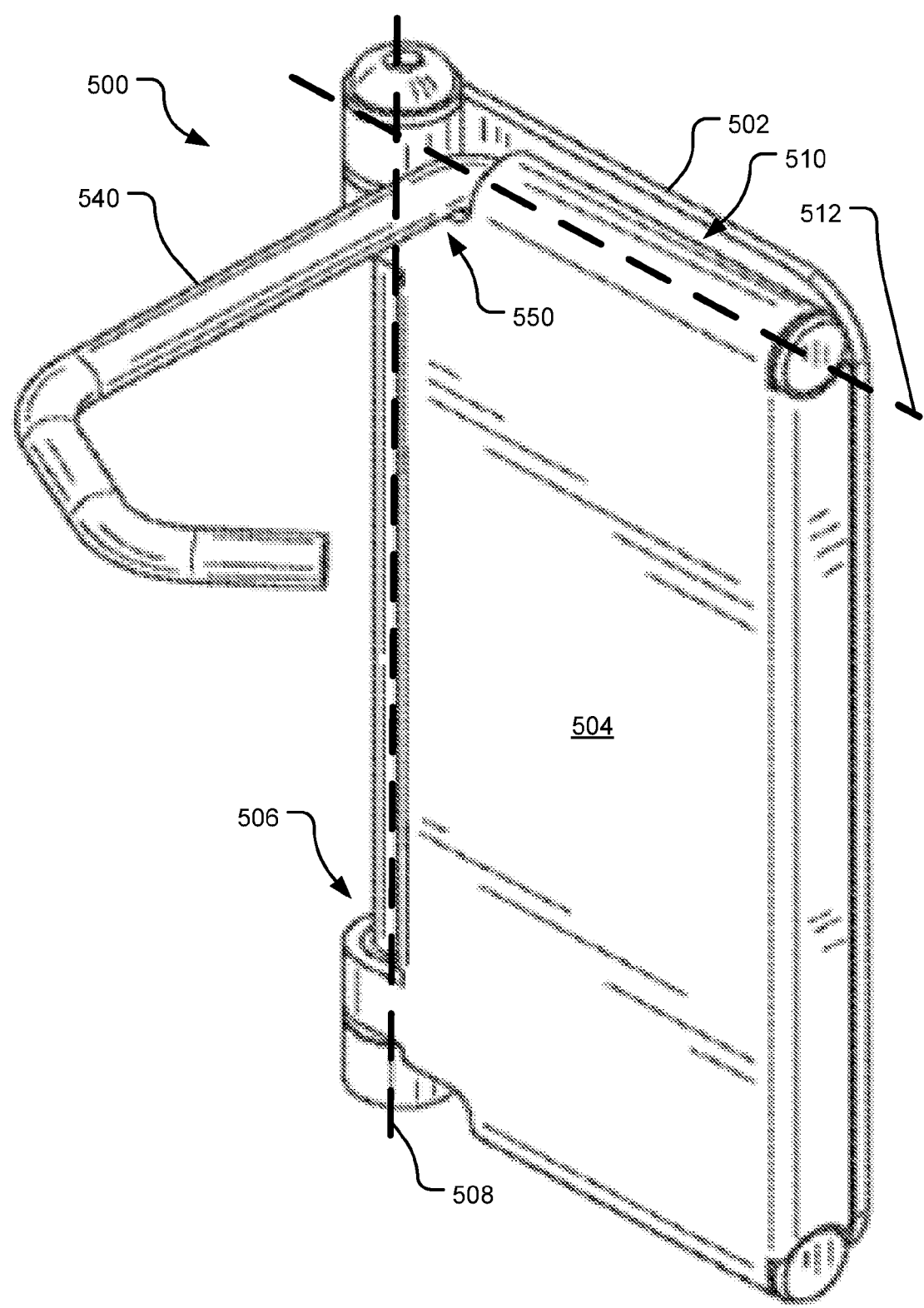
FIG. 5 is a front perspective view of an example multi-axis pivoting bracket in a closed orientation with a corresponding hook extending from the bracket.

FIG. 5 is a front perspective view of an example multi-axis pivoting bracket 500 in a closed orientation with a corresponding hook 540 extending from the bracket 500. The bracket 500 includes three major components, a back plate 502, a front plate 504, and the hook 540. The front plate 504 is rotationally attached to the back plate 502 at hinge 506. The hinge 506 allows the front plate 504 to rotate with respect to the back plate 502 about axis 508. The hook 540 is rotationally attached to the front plate 504 at hinge 510. The hinge 510 allows the hook 540 to rotate with respect to the front plate 504 about axis 512.

In the configuration of FIG. 5, the hook 540 is rotated out of the front plate 504 about axis 512 and rests in an orientation extending from the axis 512 approximately 90° from the primary interior surface plane of the front plate 504. The hook 540 is held in place at approximately 90° by gravity pressing the hook 540 against a stop 550, which may be merely a surface of the front plate 504 strategically located to maintain the orientation of the hook 540 approximately 90° from the primary interior surface plane of the front plate 504. The hook 540 itself extends away from the hinge 510. The front plate 504 is rotated against the back plate 502, concealing the cavity within the front plate 504 where the hook 540 may be stowed.

When oriented as depicted in FIG. 5, the bracket 500 is ready to receive a piece of sporting equipment by hanging the sporting equipment on the hook 540 and allowing the sporting equipment to come to rest against the front plate 504 by force of gravity. For example, if the sporting equipment is a bicycle, one of the bicycle wheels is hung on the hook 540 and the bicycle wheel is held in contact with the front plate 504 by action of gravity pulling the bicycle downward. In other implementations, the front plate 504 incorporates a vertical channel (not shown), a central depression (also not shown), or guiding vertical protrusions (also not shown) that helps in centering the hung bicycle wheel on the front plate and prevents it from shifting with respect to the front plate when the bicycle is pivoted (see e.g., pivoting operation 840 of FIG. 8). Additional detail regarding the process of using the bracket 500 is described below with regard to FIG. 8.

Figure 6:
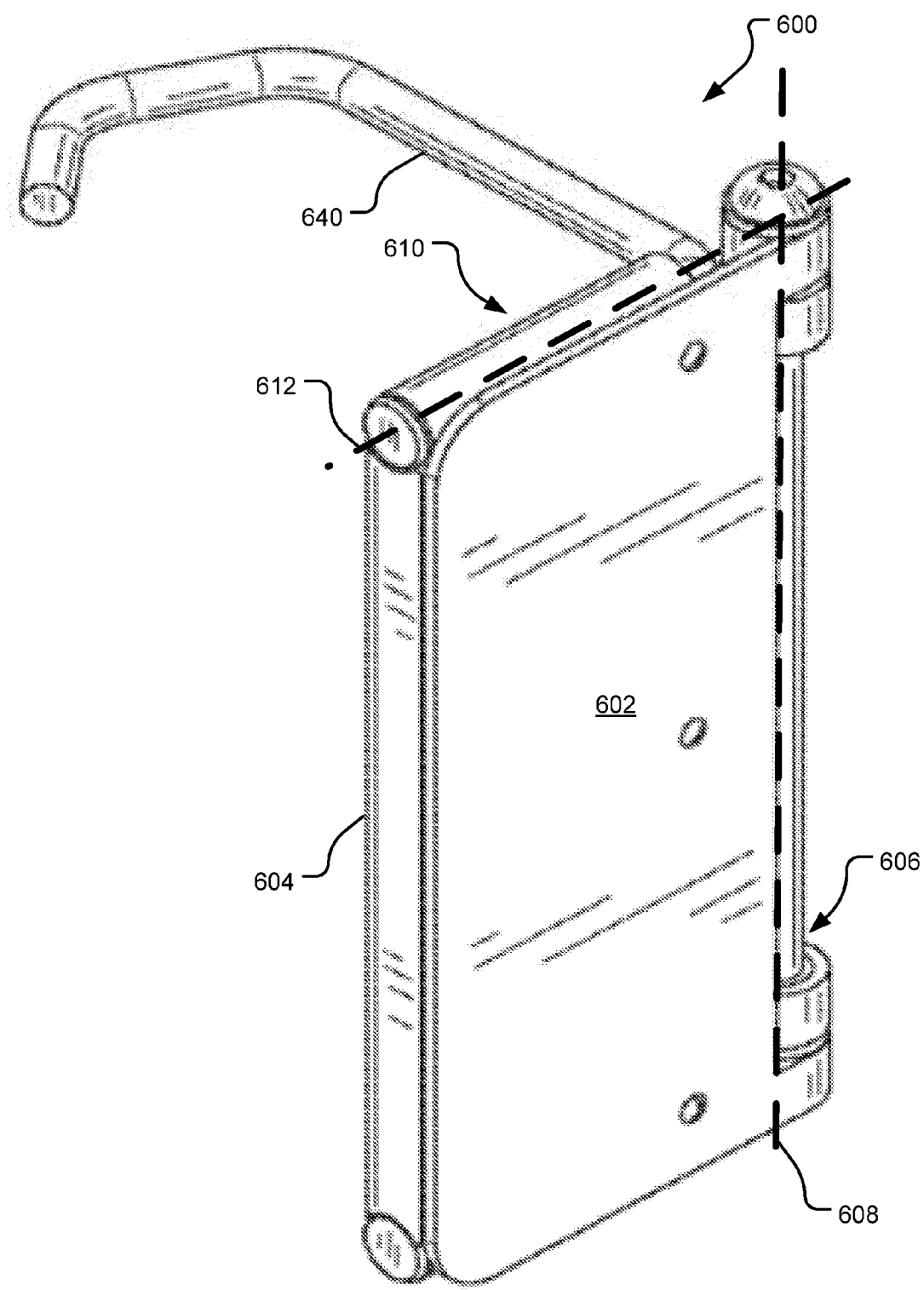
FIG. 6 is a rear perspective view of an example multi-axis pivoting bracket in a closed orientation with a corresponding hook extending from the bracket.

FIG. 6 is a rear perspective view of an example multi-axis pivoting bracket 600 in a closed orientation with a corresponding hook 640 extending from the bracket 600. The bracket 600 includes three major components, a back plate 602, a front plate 604, and the hook 640. The front plate 604 is rotationally attached to the back plate 602 at hinge 606. The hinge 606 allows the front plate 604 to rotate with respect to the back plate 602 about axis 608. The hook 640 is rotationally attached to the front plate 604 at hinge 610.

The hinge 610 allows the hook 640 to rotate with respect to the front plate 604 about axis 612.

In the configuration of FIG. 6, the hook 640 is rotated out of the front plate 604 about axis 612 and comes to rest in an orientation extending from the axis 612 approximately 90° from the primary interior surface plane of the front plate 604. The hook 640 is held in place at approximately 90° by gravity pressing the hook 640 against a stop (not shown, see e.g., FIG. 5). The hook 640 itself extends away from the hinge 610. The front plate 604 is rotated against the back plate 602, concealing the cavity within the front plate 604 where the hook 640 may be stowed.

When oriented as depicted in FIG. 6, the bracket 600 is ready to receive a piece of sporting equipment by hanging the sporting equipment on the hook 640 and allowing the sporting equipment to come to rest against the front plate 604 by force of gravity. Additional detail regarding the process of using the bracket 600 is described below with regard to FIG. 8.

Figure 7:
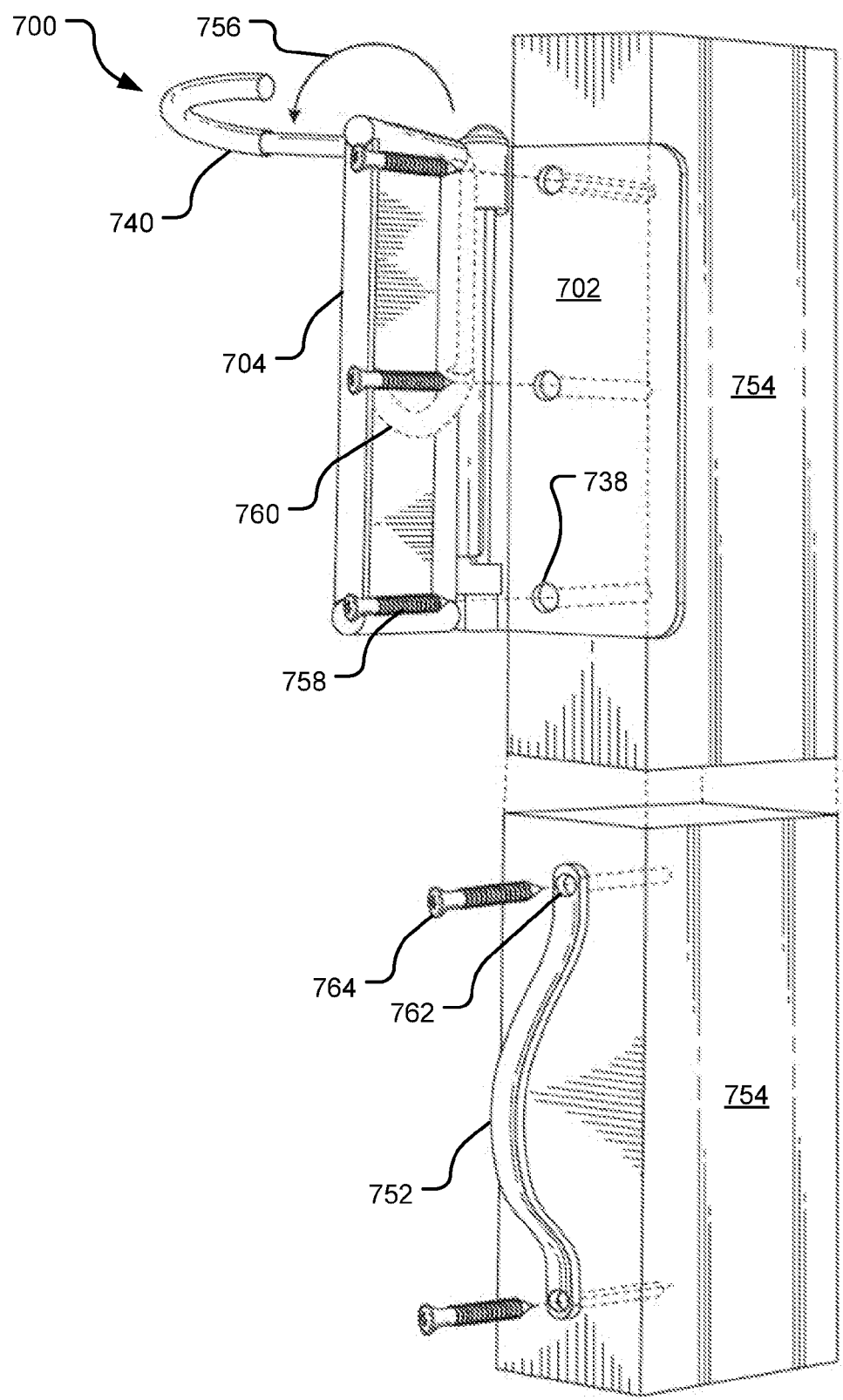
FIG. 7 is a front perspective view of an example multi-axis pivoting bracket and a pivot catch installed on a wall stud.

FIG. 7 is a front perspective view of an example multi-axis pivoting bracket 700 and a pivot catch 752 installed on a wall stud 754. The wall stud 754 is illustrative of any structural component of a wall with sufficient strength to mount the bracket 700 and support the weight of any sporting equipment intended to be hung on the bracket 700.

The bracket 700 is opened and a hook 740 previously stowed within a front plate 704 of the bracket 700 (see dashed hook 760) is rotated out of the front plate 704, as illustrated by arrow 756. This action exposes mounting holes (e.g., mounting hole 738) in a back plate 702 of the bracket 700. Screws (e.g., screw 758) attach the back plate 702 to the wall stud 754 via mounting holes (e.g., mounting hole 738) in the back plate 702. When installed, the bracket 700 is oriented vertically with the hook 740 at the top of the bracket 700.

In some implementations, a user desires the bracket 700 to open in the opposite direction from that depicted in FIG. 7 (i.e., the front plate 704 opening to the right rather than to the left). The user may then reverse the front plate 704 hinge direction prior to mounting the back plate 702 to the wall stud 754. Details on reversing the opening direction of the front plate 704 is described above with regard to FIG. 3.

The pivot catch 752 is a contoured band of material with two mounting holes (see e.g., mounting hole 762). Screws (e.g., screw 764) attached the pivot catch 752 to the wall stud 754 via the mounting holes in the pivot catch 752. When the bracket 700 is used to hang a bicycle from one of its wheels, the opposite wheel rests against the pivot catch 752 and prevents it from swinging when the bracket 700 is rotated to reposition the bicycle (see e.g., FIGS. 9 and 10).

The pivot catch 752 may be made of any suitable material (e.g., aluminum, steel, various metallic alloys, wood, rubber, and plastic). In one implementation, the pivot catch 752 is a steel band. The pivot catch 752 may be approximately ⅜ inch or ¼-½ inch wide and approximately ⅛ inch or 1/16-3/16 inch thick. The pivot catch 752 further may be approximately 5½ inches or 4-7 inches tall and extend approximately 1 inch or ½-¾ inch away from the wall.

In various implementations, the bracket 700 is installed approximately 6 feet or 5-7 feet from a ground surface. A wheel of the bicycle is hung from the bracket 700 and the pivot catch 752 is installed on the wall stud 754 at a location equal to the location of the opposite wheel of the bicycle. The bracket 700 and pivot catch 752 combination is then suitable for hanging the bicycle on a wall associated with the wall stud 754. In various implementations, the bracket 700 is capable of supporting approximately 50 pounds or 30-70 pounds of weight.

Figure 8:
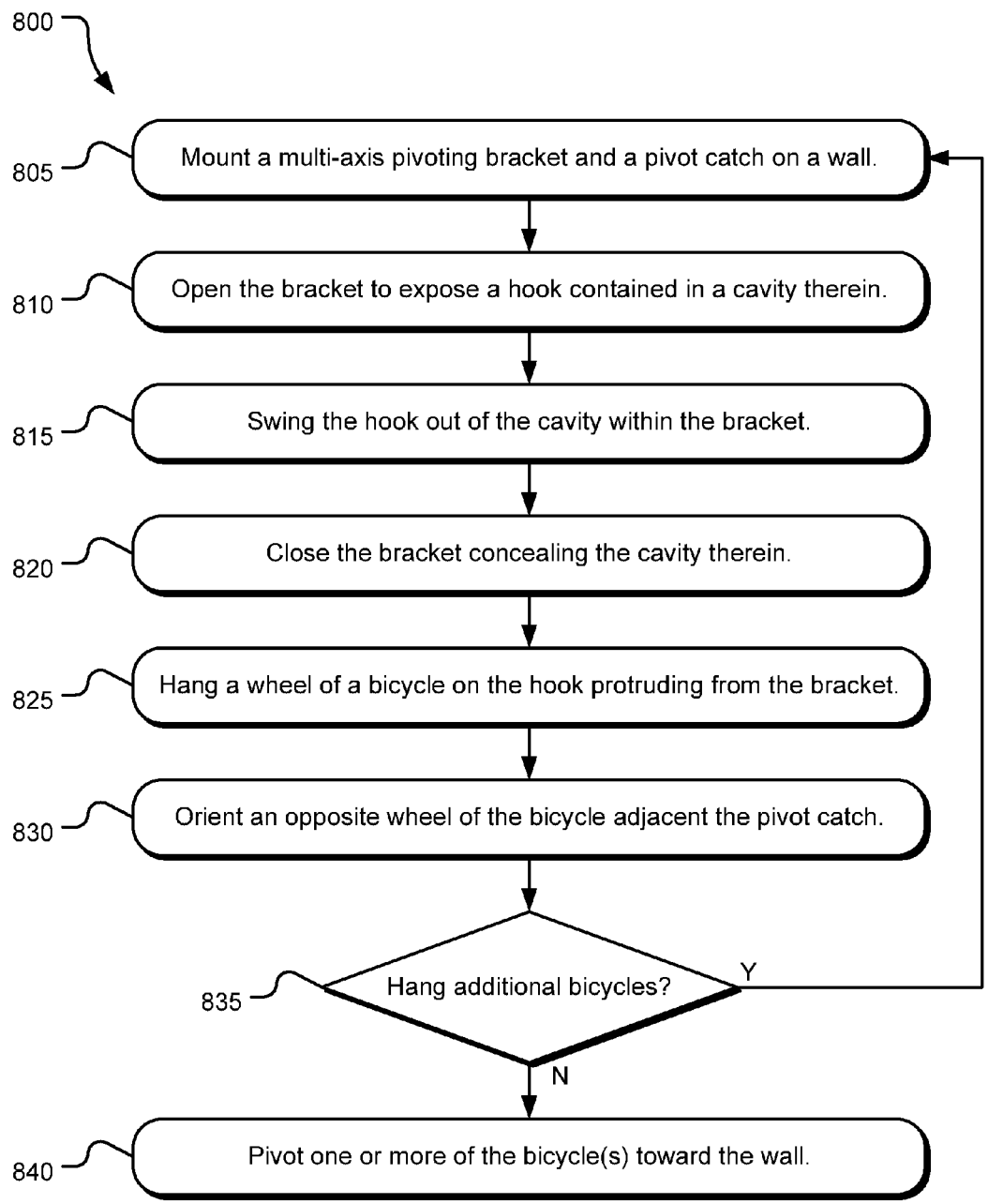
FIG. 8 illustrates example operations for hanging a bicycle on a wall using a multi-axis pivoting bracket.

FIG. 8 illustrates example operations 800 for hanging a bicycle on a wall using a multi-axis pivoting bracket. A mounting operation 805 mounts a back plate of the bracket and a pivot catch on a wall. In some implementations, the pivot catch is omitted. An example mounting configuration is shown in FIG. 7 and described in detail above. An opening operation 810 opens the bracket by rotating a front plate of the bracket away from the back plate of the bracket thereby exposing a hook stowed within a cavity of the front plate.

A swinging operation 815 swings the hook out of the cavity to an orientation that protrudes approximately 90 degrees from the primary surface of the front plate. An example bracket following completion of the swinging operation 815 is depicted in FIGS. 3 and 4 and described in detail above. A closing operation 820 closes the front plate against the back plate. This closing operation 820 conceals the front plate cavity from view. An example bracket following completion of the closing operation 820 is depicted in FIGS. 5 and 6 and described in detail above.

A hanging operation 825 hangs a wheel of a bicycle from the hook protruding from the front plate of the bracket. Gravity allows the hook to cradle the wheel and the wheel to rest against the front plate of the bracket. An orienting operation 830 orients the opposite wheel of the bicycle adjacent the pivot catch. In implementations where the pivot catch is omitted, the orienting operation 830 is also omitted.

Decision operation 835 determines if additional bicycles are to be hung on the wall adjacent the previously hung bicycle(s). If so, operations 805-830 are repeated to hang the next bicycle on the wall at a desired horizontal distance from the previously hung bicycle(s). If not, pivoting operation 840 pivots the hung bicycle(s) by rotating each front plate with respect to the back plate to achieve a desired angle of each bicycle with respect to the wall. The pivot catch prevents the wheel opposite the hung wheel from swinging while the pivoting operation 840 is performed.

Figure 9:
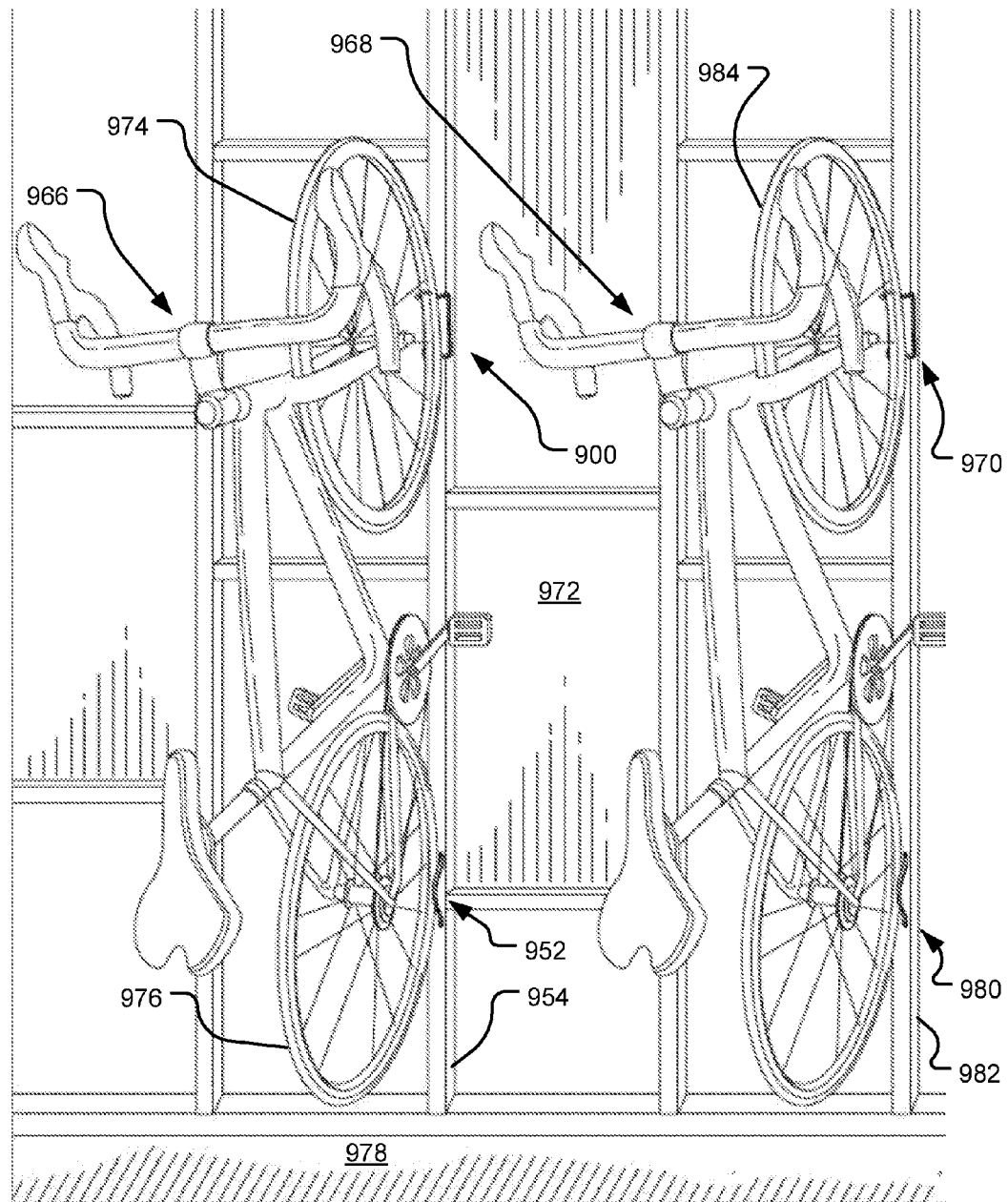
FIG. 9 illustrates an array of bicycles hanging on multi-axis pivoting brackets and extending perpendicularly from a wall.
Figure 10:
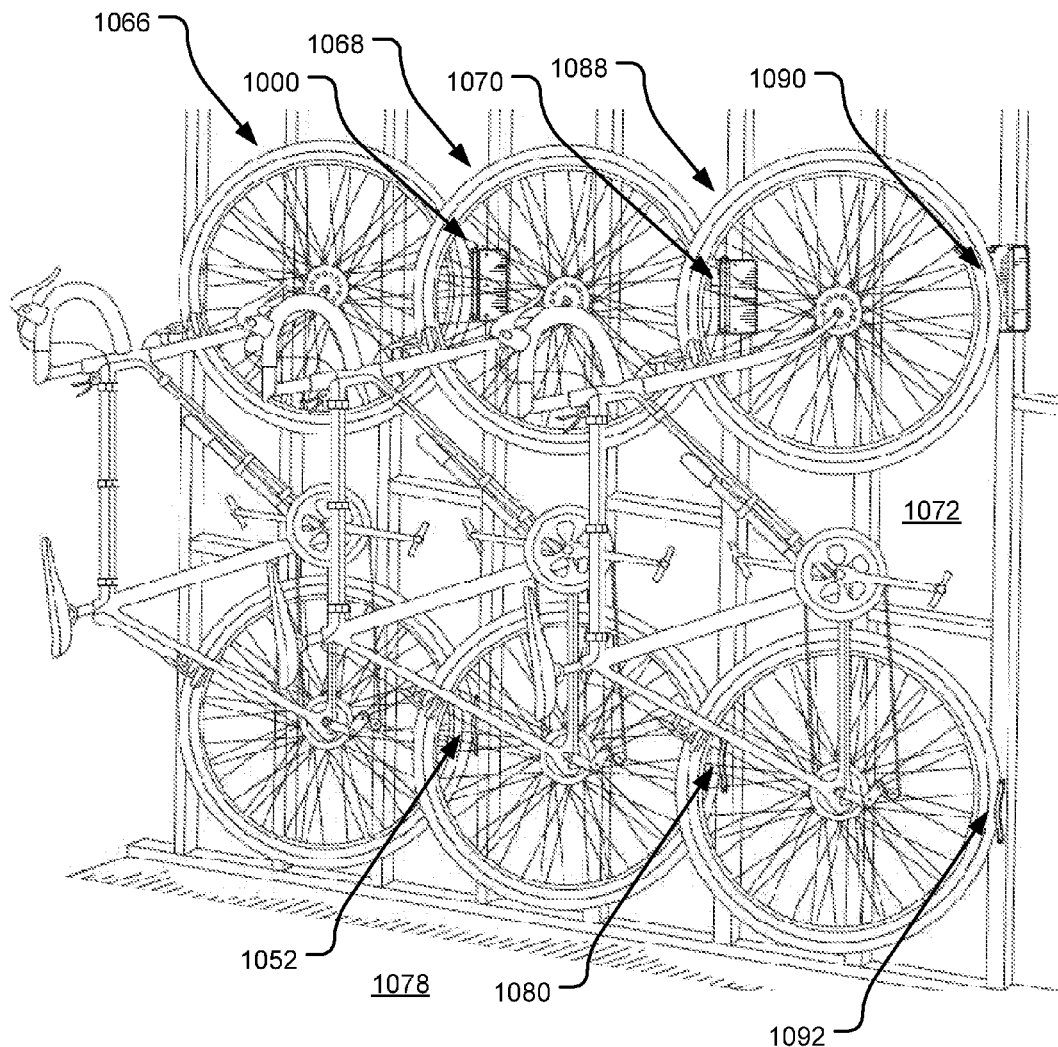
FIG. 10 illustrates an array of bicycles hanging on multi-axis pivoting brackets and extending non-perpendicularly from a wall.

The pivoting operation 840 allows the hung array of bicycles to be pivoted toward the wall, reducing floor space occupied by the bicycles projecting outward from the wall, and providing an attractive appearance of overlapping bicycles on the wall, while still allowing for easy access to each of the bicycles on the wall. FIGS. 9 and 10 described in detail below illustrate images of an array of bicycles before and after completion of the pivoting operation 840.

In addition, after a user removes a bicycle from a corresponding bracket, the user may swing the hook back into the cavity and close the bracket to stow the hook within the bracket. This produces a clean outward appearance when the bracket is not in use. A bracket in such an orientation is depicted in FIGS. 1 and 2 and described in detail above.

The logical operations making up embodiments of the invention described herein may be referred to variously as operations, steps, objects, or modules. Furthermore, it should be understood that logical operations may be performed in any order, adding or omitting operations as desired, unless explicitly claimed otherwise or a specific order is inherently necessitated by the claim language.

FIG. 9 illustrates an array of bicycles 966, 968 hanging on multi-axis pivoting brackets 900, 970 and extending perpendicularly from a wall 972. More specifically, the bracket 900 and a corresponding pivot catch 952 are each attached to wall stud 954. A front wheel 974 of bicycle 966 is hung from bracket 900. A rear wheel 976 of the bicycle 966 is placed adjacent pivot catch 952. As a result, the bicycle 966 hangs from the bracket 900 vertically and is suspended a desired distance (e.g., less than 1 foot) above floor 978.

Similarly, the bracket 970 and a corresponding pivot catch 980 are each attached to wall stud 982. A front wheel 984 of bicycle 968 is hung from bracket 970. A rear wheel 986 of the bicycle 968 is placed adjacent pivot catch 980. As a result, the bicycle 968 similarly hangs from the bracket 970 vertically and is also suspended the desired distance above floor 978. Additional bicycles (not shown) may also be mounted on the wall 972 as described above.

The bicycles 966, 968 are spaced apart a desired distance to permit a desired degree of pivoting with respect to the wall 972 (see e.g., FIG. 10 and detailed description thereof). In some implementations, the spacing is defined by available wall studs for securely mounting the brackets 900, 970. For example, if the wall studs are spaced at approximately 16 inch centers and the brackets 900, 970 are mounted on every other wall stud, the bicycles 966, 968 are spaced approximately 32 inches or 30-34 inches apart. Other implementations may orient the bicycles 966, 968 closer or further apart depending on available wall studs for mounting the brackets 900, 970 and the physical dimensions of the bicycles 966, 968 themselves. Further, while the wall studs 954, 982 are shown in FIG. 9, drywall or other wall covering may conceal the wall studs 954, 982 during actual use of the brackets 900, 970.

FIG. 10 illustrates an array of bicycles 1066, 1068, 1088 hanging on multi-axis pivoting brackets 1000, 1070, 1090 and extending non-perpendicularly from a wall 1072. More specifically, the bicycle 1066 hangs from the bracket 1000 vertically, is supported by pivot catch 1052 and is suspended a desired distance above floor 1078. Similarly, the bicycle 1068 hangs from the bracket 1070 vertically, is supported by pivot catch 1080. Also similarly, the bicycle 1088 hangs from the bracket 1090 vertically, is supported by pivot catch 1092.

As compared to the bicycles 966, 968 of FIG. 9, the bicycles 1066, 1068, 1088 of FIG. 10 are pivoted left toward the wall 1072. This allows the bicycles 1066, 1068, 1088 to consume less space outward from the wall 1072, freeing up floor space for personnel or other equipment, while still permitting access to an individual bicycle with or without rotating adjacent bicycles. The degree to which a user rotates the bicycles 1066, 1068, 1088 toward the wall 1072 may depend on the spacing of the bicycles 1066, 1068, 1088 along the wall 1072, the physical dimensions of the bicycles 1066, 1068, 1088 themselves, the user's preference regarding proximity of the bicycles 1066, 1068, 1088 to one another and the wall 1072, and the degree of access the user needs to each individual bicycle.

In various implementations, the bicycles are oriented 30°-60° outward from the wall in the orientation of FIG. 10. If only one bicycle is attached to the wall 1072, it may be oriented closer than 30° outward from the wall 1072. In implementations where the pivoting brackets 1000, 1070, 1090 are reversed (see description above with regard to FIG. 3), the bicycles 1066, 1068, 1088 are pivoted right toward the wall 1072 rather than the depicted left pivot toward the wall 1072.

While the implementations described in detail above reference sporting equipment generally, and bicycles specifically as the equipment adapted to be hung using the multi-axis pivoting brackets, other types of equipment may also be hung on the multi-axis pivoting brackets (e.g., tools, lawn and garden equipment, decorations, artwork, etc.). Further, types of sporting equipment other than bicycles may be hung on the multi-axis pivoting brackets (e.g., skis, snowboards, wakeboards, surfboards, kayaks, golf club bags, etc).

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A pivoting equipment bracket comprising:
   a back plate configured to attach the bracket to a wall;
   a front plate including a hook that projects away from the front plate;
   a plate hinge that rotationally connects the front plate to the back plate and permits the front plate to rotate with respect to the back plate, wherein the front plate includes a cavity with sufficient depth to encompass and stow the hook when the front plate is oriented adjacent the back plate; and
   a hook hinge oriented substantially perpendicular to the plate hinge that rotationally connects the hook to the front plate.

2. The pivoting equipment bracket of claim 1, wherein the hook hinge permits the hook to rotate from an orientation stowed within the bracket to an orientation that projects at approximately 90 degrees away from the front plate.

3. The pivoting equipment bracket of claim 2, wherein the hook orientation that projects away from the front plate projects at an angle approximately 90 degrees from an axis of rotation of the plate hinge.

4. The pivoting equipment bracket of claim 1, wherein the bracket is configured to secure a first end of a piece of equipment with reference to the wall, the bracket further comprising:
   a pivot catch configured to attach to the wall separately from the bracket and further configured to secure an opposite end of the equipment with reference to the wall.

5. The pivoting equipment bracket of claim 1, wherein the hook hinge may be moved from one end of the front plate to an opposite end of the front plate.

6. The pivoting equipment bracket of claim 1, wherein the plate hinge includes a pivot bolt that adjusts resistance to rotation of the front plate about the plate hinge.

7. The pivoting equipment bracket of claim 1, configured to hang a bicycle.

8. The pivoting equipment bracket of claim 1, wherein the plate hinge is configured to pivot a piece of sporting equipment against the wall.

9. A method comprising:
   mounting a back plate of a pivoting equipment bracket to a wall;
   swinging a hook out of a cavity within the bracket by rotating the hook about a hook hinge connected to a front plate of the bracket;
   hanging a piece of equipment from the hook; and
   pivoting the piece of equipment toward the wall about a plate hinge rotationally connecting the front plate to the back plate, wherein the hook hinge is oriented substantially perpendicular to the plate hinge.

10. The method of claim 9, wherein the piece of equipment is a bicycle and the hanging operation includes hanging a first wheel of the bicycle from the hook and resting the first wheel against the front plate of the bracket.

11. The method of claim 10, further comprising:
    mounting a pivot catch on the wall in vertical alignment with the back plate;
    orienting a second wheel of the bicycle on the wall adjacent the pivot catch after the hanging operation and prior to the pivoting operation.

12. The method of claim 10, wherein the mounting, swinging hanging, and pivoting operations are repeated with multiple bicycles.

13. The method of claim 9, wherein the pivoting operation rotates the piece of equipment in one of a left rotational direction toward the wall and a right rotational direction toward the wall.

14. A pivoting bicycle bracket comprising:
    a back plate configured to attach the bracket to a wall;
    a front plate;
    a plate hinge rotationally connecting the front plate to the back plate and permitting the front plate to rotate with respect to the back plate;
    a hook; and
    a hook hinge oriented substantially perpendicular to the plate hinge rotationally connecting the hook to the front plate and permitting the hook to rotate from an orientation stowed within a cavity in the bracket with sufficient depth to encompass the hook to an orientation that projects away from the front plate.

15. The pivoting bicycle bracket of claim 14, wherein the bracket is configured to secure a first wheel of the bicycle with reference to the wall, further comprising:
    a pivot catch configured to attach to the wall separately from the bracket and further configured to secure a second wheel of the bicycle with reference to the wall.

16. The pivoting bicycle bracket of claim 14, wherein the hook hinge may be moved from one end of the front plate to an opposite end of the front plate.

17. The pivoting bicycle bracket of claim 14, wherein the hook orientation that projects away from the front plate projects at an angle approximately 90 degrees from an axis of rotation of the plate hinge.

18. The method of claim 9, further comprising:
    adjusting resistance to rotation of the front plate about the plate hinge.

19. The method of claim 9, further comprising:
    moving the hook hinge from one end of the front plate to an opposite end of the front plate.

* * * * *